United States Patent [19]

Strater et al.

[11] Patent Number: 5,165,063

[45] Date of Patent: Nov. 17, 1992

[54] DEVICE FOR MEASURING DISTANCES USING AN OPTICAL ELEMENT OF LARGE CHROMATIC ABERRATION

[75] Inventors: Hans-Dieter Strater, Frankfurt am Main, Fed. Rep. of Germany; Daniel Gross, Carouge; Karl M. Jauch, Le Lignon, both of Switzerland

[73] Assignee: Battelle-Institut e.V., Frankfurt am Main, Fed. Rep. of Germany

[21] Appl. No.: 642,200

[22] Filed: Jan. 16, 1991

Related U.S. Application Data

[63] Continuation-in-part of Ser. No. 302,596, Jan. 24, 1989, abandoned.

[30] Foreign Application Priority Data

Jun. 26, 1987 [CH] Switzerland ............... 02427/87-1
Jun. 21, 1988 [EP] European Pat. Off. ...PCT/EP/00541

[51] Int. Cl.⁵ ............... G01C 3/08; G01B 11/24; G01J 1/20
[52] U.S. Cl. ................... 356/4; 250/201.4; 250/201.8; 356/372; 356/375; 356/376
[58] Field of Search ............ 356/4, 372, 375, 376; 250/201.4, 201.8

[56] References Cited

U.S. PATENT DOCUMENTS 4,585,349  4/1986  Gross et al. ............... 459/53
4,770,532  9/1988  Ito ........................... 356/372

FOREIGN PATENT DOCUMENTS 0142464  11/1984  European Pat. Off. .
1506196  10/1967  France .
2550332  3/1985  France ................... 395/75
2144537  1/1984  United Kingdom .
2131576  5/1984  United Kingdom .

OTHER PUBLICATIONS

IBM Technical Disclosure Bulletin, vol. 27, No. 12, May 1985, (New York), "Chromatic Focusing Technique", pp. 6850–6851.
IBM Technical Disclosure Bulletin, vol. 16, No. 2, Jul. 1973, (New York), J. R. Malin, "Optical Micrometer", pp. 433 to 434.
R. A. Jarvis, "A Perspective on Range Finding Techniques For Computer Vision" Transaction on Pattern Analysis and Machine Intelligence, Band PAMI-5 IEEE, No. 2, Mar. 1983, (New York), pp. 122 to 139 (Jarvis).

Primary Examiner—Stephen C. Buczinski
Attorney, Agent, or Firm—Fisher, Christen & Sabol

[57] ABSTRACT

The method serves for measuring the profile of a rough, reflecting surface as a function of the distance between each point of this profile and a polychromatic light source. This object is reached, e.g., by forming a flat light bundle from the light of this source and imagining it on the profile by means of a chromatic lens element. This leads to a light band of different colors, which indicate the profile contour. Analysis by means of a spectral-dispersive apparatus reconstructs the contour profile of the object.

16 Claims, 4 Drawing Sheets

FIG. 6
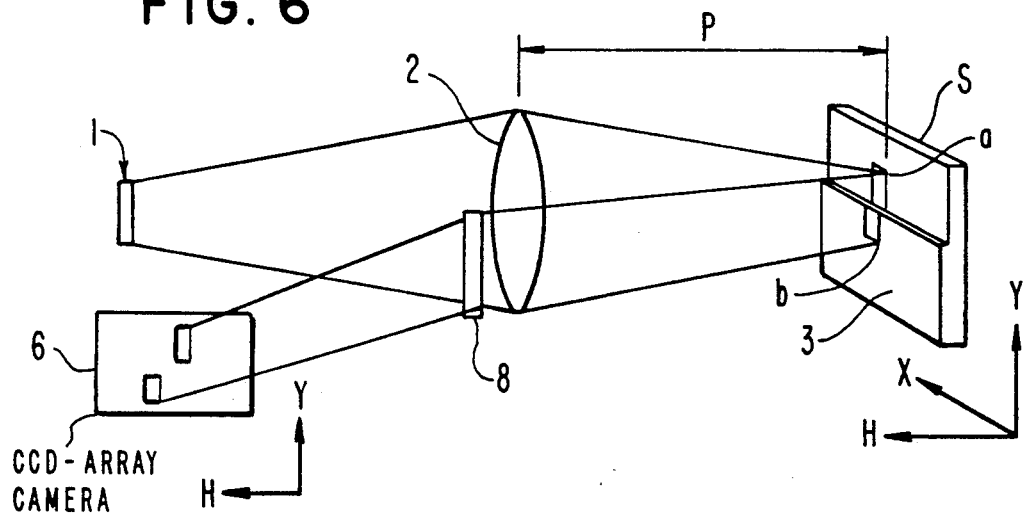
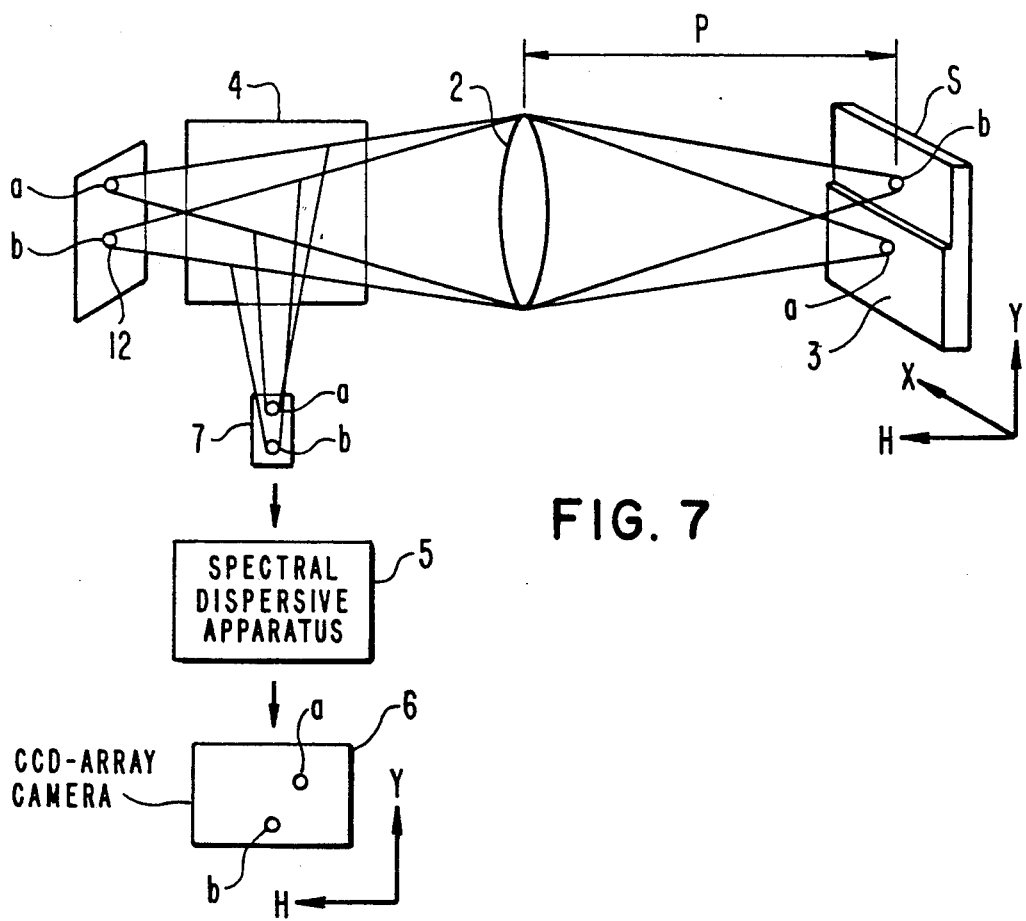
FIG. 7

DEVICE FOR MEASURING DISTANCES USING AN OPTICAL ELEMENT OF LARGE CHROMATIC ABERRATION

This is a continuation-in-part of U.S. Ser. No. 302,596, filed as PCT/EP/00541, Jun. 21, 1988, now abandoned.

BACKGROUND OF THE INVENTION

1. Field of the Invention

The present invention relates to a device for measuring distances between an optical element of large chromatic aberration and an object, white light emitted by a light source being imaged on the object by the optical element, said object reflecting a fraction of the incident light which is imaged on a spectral-dispersive apparatus.

2. Background Art

A normal glass lens may be used to focus white light, emerging from an aperture (see, e.g., FIG. 1). A rough look at the screen shows an image of the aperture, if the screen is located at the correct distance d from the lens. If the experiment is repeated with filters of different colors positioned between the lamp and the aperture, one finds that different distances d have to be chosen to get sharp images of the aperture for the different colors. This is well known in optics ("chromatic aberration").

White light is a mixture of light of different colors. If the experiment shown in FIG. 1 is repeated more carefully with white light, we will find the sharp image of the blue component at the distance d(blue) and the sharp image of the red component of the white light at a distance d(red) (see, FIG. 2). The colors red and blue have been chosen as examples, because they form the long and the short wavelength limit of the visible spectrum of light. The other colors out of the white light, which are not shown in FIG. 2, have their focus somewhere between the red one and the blue one. Actually, at any position between A and B of FIG. 2, there is one color, which has its sharp image exactly there.

A screen, positioned at B, will show a sharp image of the red component. This means, that all the red light is concentrated in a small circular area (see, FIG. 3). All the other colors are distributed over a much larger area. This means that a spectral analysis of the central spot's illumination will show that it is red because the illumination density (amount of light per unit area) is highest for the red light and lowest for the blue light.

At a different position of the screen, another color will dominate the center. Thus, the color of the central spot is correlated to the spacial position of the screen and an analysis of this color will give the position of the screen (i.e., relative to the lens and light source). The "screen" can be almost any object that scatters or reflects light. Thus, the analysis of the central color becomes a measurement of the distance between the lens and arbitrary objects.

All the effects described above are difficult to observe with normal lenses, because normally lens makers try to make these effects as small as possible. On the other hand, there are optical components, which show these effects strongly. One way to enhance these effects is the choice of special glasses for the lens. Another way is to use a "zone plate" instead of a lens. A zone plate is a diffraction grid with especially spaced circular grooves. The refracting power is proportional to the wavelength of the incident light. Thus, for example, the focal length of a f=10 cm zone plates differs by some centimeters for red and blue light.

In the U.S. Pat. No. 4,585,349 it has been proposed to optically measure the distance of a point of the reflecting surface that is located on the optical axis of the measuring device. This measurement is based on focusing of polychromatic light, each focal distance being characteristic of the respective wavelength. By trapping the light reflected by that part of the surface to be measured which is located on the optical axis, an intensity maximum of the wavelength is measured which is characteristic of the distance of this part of the reflecting surface. To perform this measurement, the reflected light is transmitted to a diffraction grating which scatters it according to its various wavelengths, and a series of optical measuring cells are used to determine the wavelength of the highest light intensity received. The focal distance of this wavelength corresponds to the distance between the holographic lens for focusing the polychromatic light and the reflecting surface. This solution permits measurement of the distance of a point, but not imaging of the surface profile, which substantially limits its area of application.

In addition, a conventional optical depth measurement method is known which is based on the effect of the parallax or of triangulation, according to which a light bundle is projected on an object. A detector observes this point or this illuminated line at different angles. The effect of the parallax permits calculation of the distance of the surface or of its profile.

The drawback of this method is to be seen in the fact that either the angle of light or the angle of observation or both must be oblique, which limits the depth of the holes or grooves that can be observed.

The basic ideas of chromatic sensors have been described above, but this still leaves unsolved the problem of analyzing the color of the central spot. One possibility is to use the lens (or zone plate) to monitor the central spot. This can be done by inserting a semitransparent mirror between the aperture and the lens (see, FIG. 4). One half of the light, emerging from the aperture, traverses the mirror and reaches the screen (the object). The light, scattered by, or reflected from the object, is then collected by the lens (or zone plate) and directed back towards the mirror. One half of the returning light passes the mirror towards the aperture and is lost. The other half is reflected downwards onto the spectrum analyzer.

There is an aperture in front of the spectrum analyzer which allows only the light of the central spot to pass (naturally, if all the light which is reflected by the object were summed and analyzed, the spectrum would be that of the white light emitted by the lamp, but the present invention definitely does not perform in this way—rather, by allowing only the light from the central spot to enter the analyzer, the wavelength-dependant distance measuring capabilities discussed above with reference to FIGS. 1-4 are preserved). For color analysis, nearly every optical spectrum analyzer is suitable.

SUMMARY OF THE INVENTION

As discussed above, it is possible to build a point sensor, which allows measurement of the distance between one point on the screen (or an arbitrary object) and the lens (or zone plate). One new idea is that most kinds of spectrometric analyzers allow analysis of the light of more than one point simultaneously. One normal mode of operation for a monochromator is to use a slit as an entrance aperture and another slit as an exit aperture (e.g., an Eberth design prism analyzer). This mode is normally used to enhance the sensitivity of the analyzer, because more light can go through a slit-like aperture than through a pin-hole-like aperture [normally, e.g., when one light source is used to illuminate the entrance slit, and one detector is used to monitor the light emerging from the exit slit, tuning (analyzing) is done by changing the position of the exit slit and the detector]. This is not done in the present invention, however.

The object of the present invention is to provide a device which permits the profile of a test piece to be determined without moving either the sensor or the test piece. The invention device involves a device for measuring distances between an optical element (2) of large chromatic aberration and an object (S). White light emitted by a light source (1) is imaged on the object (S) which reflects a fraction of the incident light that is imaged on a spectral-diversive apparatus (5). The object of the invention is achieved by the light source (1) being formed by at least two light points. Hereby it becomes possible in a simple manner simultaneously to perform several measurements at different points of the test piece by means of at least two light points, without mechanical movement, and thus to generate linear profile sections. In addition, it is possible to measure the test piece on an arbitrarily defined matrix. The light points can have different distances to the principal plane, of the optical element in order thus to achieve an extended measuring range or higher measuring accuracy.

When several light points of a light source (1) are arbitrarily arranged in a plane, for example, the light points are arranged on a straight line, on a triangle, on a square or at the corner points of an arbitrary polygon, control or measuring points to be defined which are adapted to the test piece can be achieved. By using several parallel light bands, a plurality of measuring points are covered simultaneously, and thus a real coverage of the test piece is achieved.

When the width and length of the slit-shaped light source (1) are equal or almost equal to the input slot (7) of a spectral-dispersive apparatus (5), or when a prism or a direct-vision prism or a diffraction grating is used as the apparatus (5), optimum transmission of the reflected light through the spectral-dispersive apparatus is reached.

When the device has a transparent diffraction grating (8) for angular scattering of the light reflected by the profile of said surface (3) in accordance with the angles that are characteristic of the various wavelengths, as well as a receiving surface for the resultant image being provided (the lateral deflections being characteristic of the distances of the various parts of said profile along the optical axis), such favorable configuration permits compact and low cost design. When the transparent diffraction grating (8) is arranged adjacent to an optical focusing device, such favorable configuration of the device permits compact and low-cost design. Alternative use of glass lens and zone plate results in a measurement range that can be varied within wide limits.

BRIEF DESCRIPTION OF THE DRAWINGS

In the Drawings:

FIG. 6 shows a second embodiment with transmitted-light grating;

FIG. 7 shows a third embodiment with point light sources;

DETAILED DESCRIPTION OF THE INVENTION

In the following, the invention is described in detail on the basis of drawings showing several embodiments.

Figure 1:
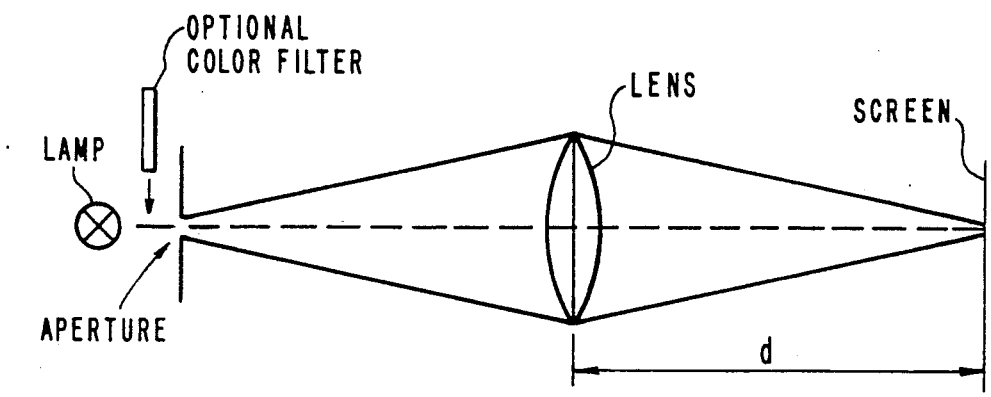
FIG. 1 shows the basic principle of chromatic aberration.
Figure 2:
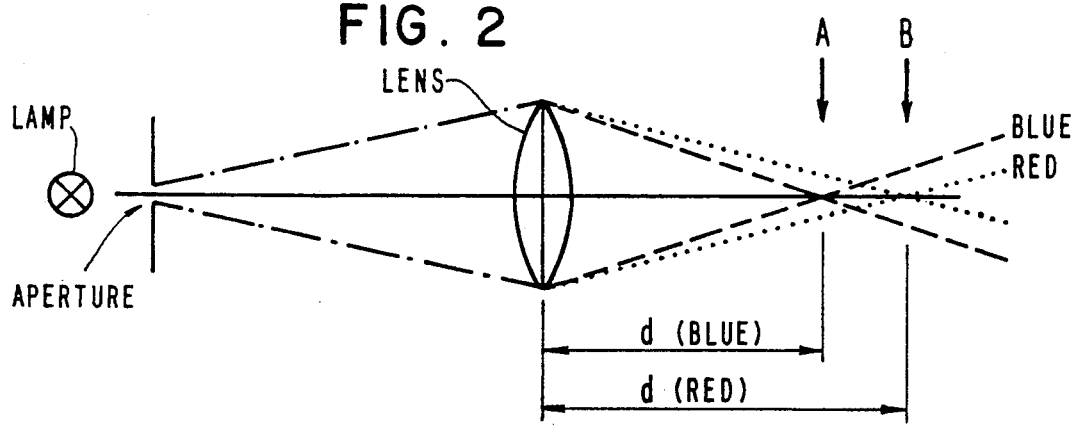
FIG. 2 shows the principle of chromatic aberration with respect to light of differing wavelengths.
Figure 3:
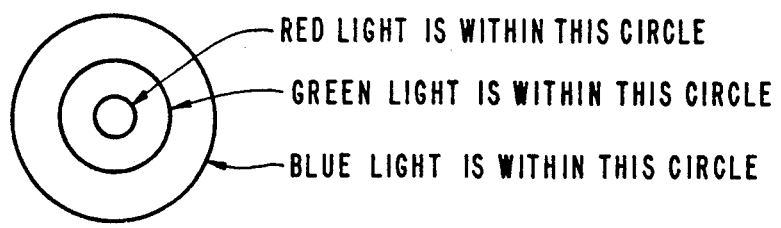
FIG. 3 shows a view perpendicular to the direction of propagation of the light taken at point B of FIG. 2.
Figure 4:
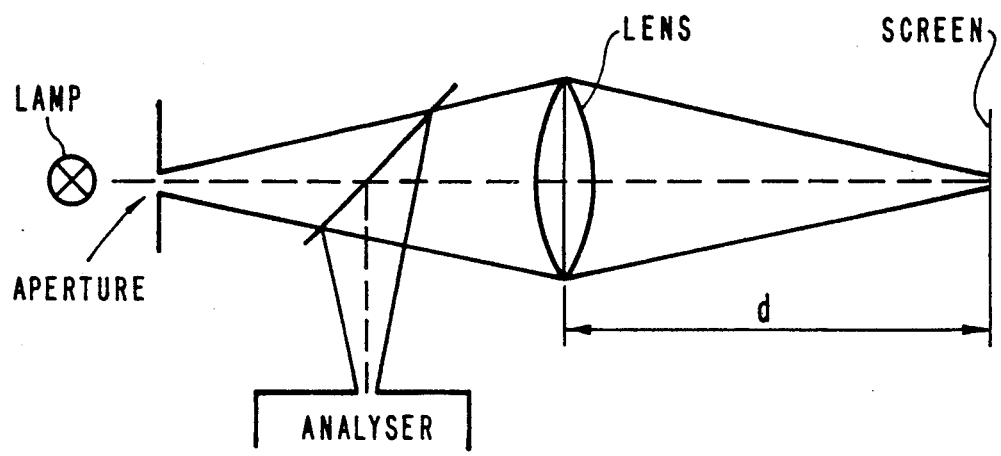
FIG. 4 shows a top view of a chromatic sensing apparatus showing the use of a semitransparent mirror to facilitate analysis of the light reflected by the screen.
Figure 4:
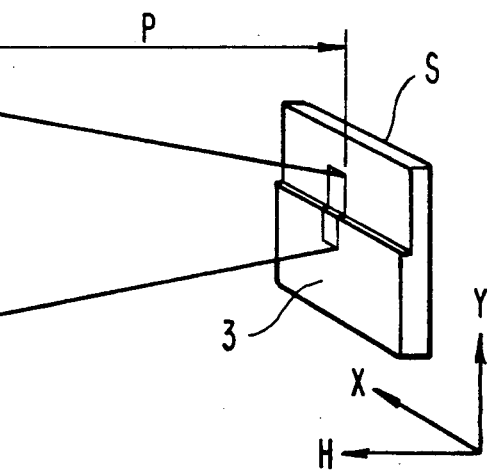
Figure 5:
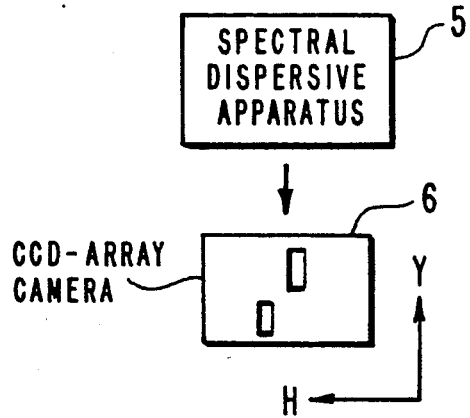
FIG. 5 shows the principle of the device for measuring a linear profile section according to the invention.

FIG. 5 depicts a polychromatic, band-shaped light source 1 with wide spectrum. This light is transmitted to a chromatic lens 2, whose object is to focus the light as a function of its various wavelengths (i.e., through accentuating the wavelength-dependant dispersion of the light as discussed above with reference to FIG. 2). The reflecting surface 3 which is to be measured is arranged at a distance p from the lens 2. The light beam contacts this surface 3 and generates an image which is sharply defined for one color at each illuminated point (as a function of the distance of the individual surface points from the lens 2—as discussed above with reference to FIG. 3). The scattered/reflected light is re-imaged by the chromatic lens 2 and conducted to the entrance slit 7 of a spectral-dispersive apparatus 5 via a semitransmitting mirror 4. This spectral-dispersive apparatus 5 converts the wavelength information for each point into spatial information, so that a profile image of the surface 3 is obtained at the output of apparatus 5 (see, e.g., FIG. 7 wherein the differences in distance between the lens 2 and two different points (a,b) on surface 3—i.e., the distance H that the two points are apart from each other, is measured by the spectral-dispersive apparatus 5 and represented on the CCD-array camera 6 as a horizontal distance H between the two light points—over the corresponding distance on the Y axis), said profile image being incident on a black-and-white CCD-array camera 6.

Figure 10:
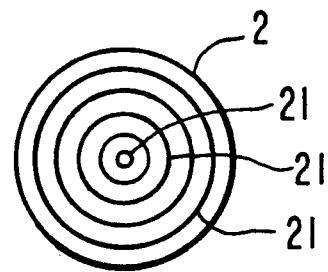
FIG. 10 shows an alternate lens having concentric diffraction rings whose spatial frequency increases toward the edge of the lens.

To increase the chromatic effect, a zone plate or a chromatically uncorrected lens or a combination of several lenses can be used as chromatic element (lens 2). For example, FIG. 10 shows chromatic lens of a zone-plate type having concentric diffraction rings 21 whose spatial frequency increases in the direction towards the edge of the lens which may advantageously be employed as the chromatic element (lens 2).

Figure 8:
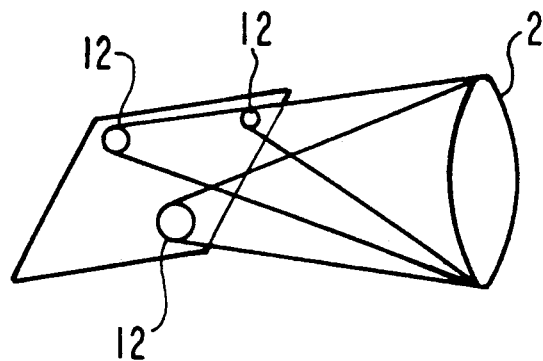
FIG. 8 shows an alternate light source having individual light points distributed in a triangular fashion at varying distances from the lens.
Figure 9:
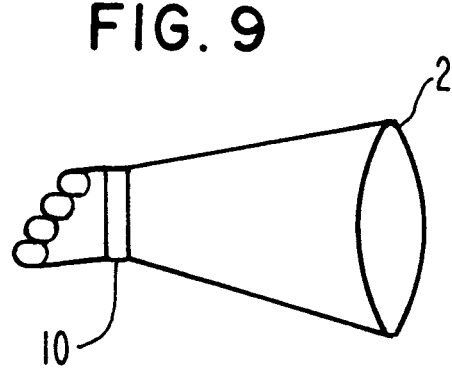
FIG. 9 shows an alternative light source wherein a plurality of point sources formed by diaphragms give rise to light rays which merge to form a light band.

The light source 1 can be formed by illuminated slits and point-shaped diaphragms (See, FIG. 9) or appropriate light guides. The shape of the light source can be readily adapted to any problem. In addition to the use of a light band according to FIG. 5, it may be advantageous to use several light area elements or light bands 10 or several light points 12 in a desired measuring matrix. For example, it is possible to provide two light points 12 at an appropriate distance or n light points at the corners of an n-gon. If the profile of the surface is approximately known, it is advantageous not to arrange the individual light points 12 or light area elements 10 in a plane parallel to the principal plans of the lens element 2, but to provide different distances from the lens 2 for individual light area elements 10 (See, e.g., FIG. 8 showing three light spots 12 disposed differing distances from the lens 2 in the shape of a triangle). In this way, for a given distance p between the lens 2 and the object 3, each of the three light spots 12 will give rise to a light spot (which is displayed on the CCD-array camera 6) of different color (in an analogous fashion to that shown in FIG. 3) since each of the three light spots 12 is a different distance from the lens 2.

When distinct light spots 12 are used as the light source, see, e.g., FIG. 7, each light spot 12 of input light projects onto (and hence measures the distance relative to lens 2) a specific spot on the object 3 [note: the vertical relationship between the two points a,b is reversed by the lens 2 so that at the object 3 the points a,b are reversed relative to their positions at the source; the lens 2 reverses the light spots a,b again as the light returns through the lens to the semitransmitting mirror 4 so that the original vertical positioning (but, with the added lateral displacement between a,b to reflect the differing distances the light points travelled from the lens 2 to the object 3 now incorporated in to the positioning of a,b is again achieved]. The spatial relationship between points a,b on object 3 may be calculated from the H-Y plot of a,b on the CCD array camera 6 (see FIG. 7).

In addition to the principle of outcoupling by a semitransmitting mirror which is shown in FIG. 7, it is advantageous to fix a transmitted-light grating 8 directly at the lens 2, so that it covers about half the lens area (FIG. 6). The dispersive elements for both methods may be prisms, direct-vision prisms or gratings. As an alternative, it is possible not to use a dispersive element (apparatus 5 or transmitted-light grating 8), but to focus the re-imaged light for each illuminated point directly on a pair of photodetectors (which are not depicted in the drawing) and show a different sensitivity for each individual wavelength. The central wavelength of the reflected light is then derived from the quotient of the signal levels of the two detectors. In this case one pair of detectors is required for each point on the surface.

What is claimed is:

1. A device for measuring distances between an optical element having a large chromatic aberration and an object along an optical axis, said device comprising:
   (a) a spectral-dispersive apparatus; and
   (b) a light source;
   said light source emitting white light which is imaged on the object, said object thereafter reflecting a fraction of said light back through said optical element and onto said spectral-dispersive apparatus, and said light source being formed by at least two points;
   said spectral-dispersive apparatus comprising a transparent diffraction grating for scattering the light reflected by the surface profile of said object in accordance with a plurality of diffraction angles characteristic of the various wavelengths of said light, said diffraction angles each producing characteristic lateral deflections relative to said optical axis and a receiving surface for receiving the scattered light, which forms a plurality of resultant images, said lateral deflections of said resultant images of said reflected light which has been scattered by said diffraction grating onto said receiving surface being characteristic of the distances from said optical element to the various parts of said surface profile of said object along said optical axis between said light source and said object;
   whereby said lateral deflections between said resultant images on said receiving surface correspond to the differences in distance along said optical axis between said light source and corresponding points on said object.

2. The device as claimed in claim 1 wherein said at least two light points of said light source are arranged in a plane that is approximately parallel to a principal plane of the optical element, said principal plane of said optical element being defined by the two largest dimensions of said optical element.

3. Device as claimed in claim 1 wherein the light source is formed by more than two light points.

4. The device as claimed in claim 1 wherein said light points of said light source are arranged at different distances from said principal plane of said optical element.

5. The device as claimed in claim 1 wherein said light points of said light source are arbitrarily arranged in a plane.

6. The device as claimed in claim 5 wherein said light points of said light source are arranged within said plane, on a straight line, on a triangle, on a square or at the corner points of an arbitrary polygon.

7. The device as claimed in claim 1 wherein said light source comprises at least one light band, said at least one light band being shaped by diaphragms.

8. The device as claimed in claim 1 wherein the width and length of said light source are at least approximately equal to the width and length of the entrance slit of said spectral-diversive apparatus.

9. Device as claimed in claim 8 wherein a prism or a direct-vision prism or a diffraction grating is used as the spectral-dispersive apparatus.

10. The device as claimed in claim 1 further comprising a direct-vision prism; and
    a semitransmitting mirror, said semitransmitting mirror being arranged between said optical element and said light source;
    whereby the light reflected by said object, after passing back through said optical element and said semitransmitting mirror, is imaged on the entrance slit of said spectrum analyzer.

11. The device as claimed in claim 1 wherein said transparent diffraction grating is arranged adjacent to said optical element.

12. Device as claimed in claim 11 wherein the transparent diffraction grating has a surface area that is substantially half as large as the surface area of the optical element.

13. Device as claimed in claim 1 wherein the optical element comprises a glass lens or a chromatic lens of zone-plate type having concentric diffraction rings whose spatial frequency increases in the direction toward the edge of the lens.

14. The device as claimed in claim 1 wherein said receiving surface comprises a flat CCD grating.

15. Device as claimed in claim 1 wherein a prism or a direct-vision prism or a diffraction grating is used as the spectral-dispersive apparatus.

16. A device for measuring distances between an object and a lens, comprising:
   (a) a source of multi-chromatic light comprising at least two light spots, the light produced by said light source being directed to said object by said lens;
   (b) a spectral-dispersive apparatus for receiving said light after said light has been reflected by said object and redirected by said lens, said spectral-dispersive apparatus comprising a transparent diffraction grating for scattering the multichromatic light reflected by said object by wavelength, whereby the pattern of scattered light corresponds to the surface configuration of said object;
   (c) means to for receiving and displaying the pattern of scattered light produced by said diffraction grating; and
   (d) means for measuring the lateral displacement between said images of said scattered light on said receiving and display means, whereby the lateral displacements between said images reflect the distances between said optical element and various corresponding points on the surface of said object.

* * * * *